No. 885,963.
PATENTED APR. 28, 1908.
J. SIEFFERT.
POTATO PLANTING MACHINE.
APPLICATION FILED AUG. 13, 1907.
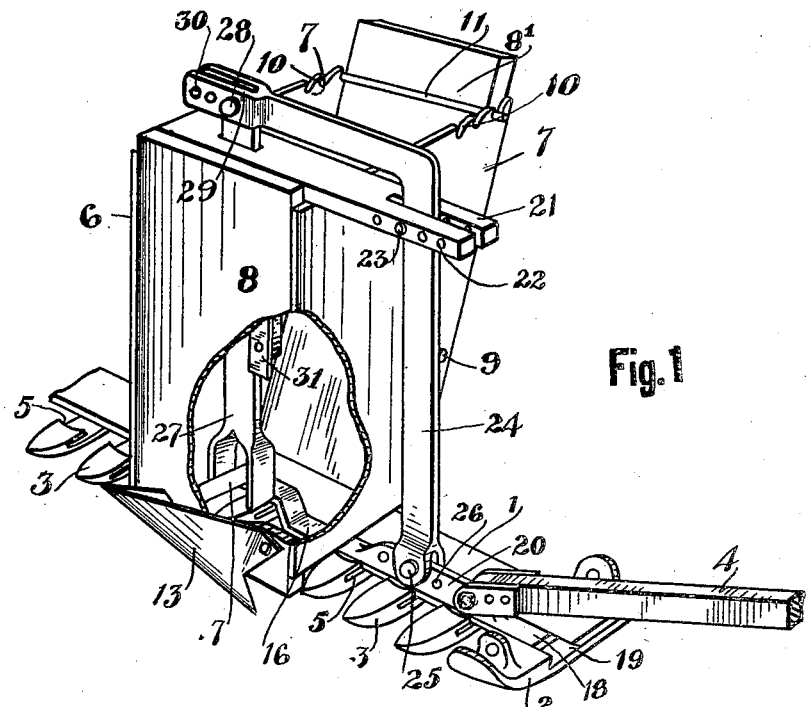
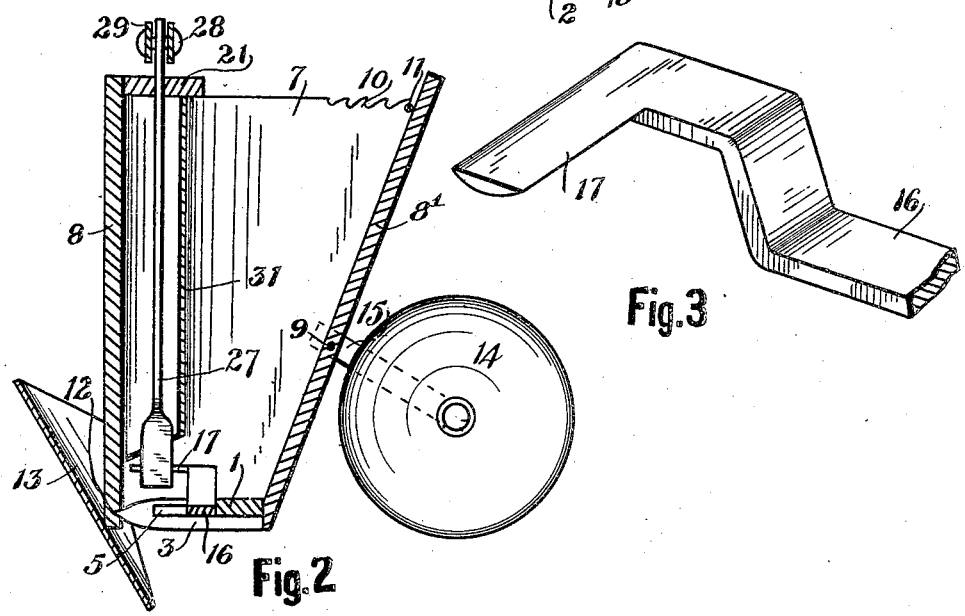
Witnesses.
Inventor

UNITED STATES PATENT OFFICE.

JOHN SIEFFERT, OF WINNIPEGOSIS, MANITOBA, CANADA.

POTATO-PLANTING MACHINE.

No. 885,963.　　　　Specification of Letters Patent.　　　Patented April 28, 1908.

Application filed August 13, 1907. Serial No. 388,388.

*To all whom it may concern:*

Be it known that I, JOHN SIEFFERT, of the village of Winnipegosis, in the Province of Manitoba, Canada, farmer, have invented certain new and useful Improvements in Potato-Planting Machines, of which the following is the specification.

My invention relates to a potato planting machine, and the object of the invention is to provide a machine which is simple in construction, efficient in operation, strong and durable, and which is adapted to be attached to the finger bars of the ordinary hay mower now in use, in this wise decreasing the number of parts and thus cheapening the complete construction.

It consists essentially of a hopper having a pivoted back adapted to hold the hopper to the finger bar, a horizontally reciprocating bar carrying a knife operating within the hopper, the said bar being attached to the pitman of the mower, a vertically reciprocating fork within the hopper, a forward shoe on the hopper and a rearward disk, and means for locking the pivoted back in any desired position, the parts being arranged and constructed as hereinafter more particularly described.

Figure 1 is a perspective view of my invention, showing it applied on the finger bar, and its connection with the pitman, a portion of the hopper being broken away for the sake of clearness. Fig. 2 is a vertical sectional view through the center of the hopper, the knife and fork being left in side elevation. Fig. 3 is an enlarged detailed perspective view of the knife.

In the drawings like characters of reference indicate corresponding parts in each figure.

In the drawings I have simply shown the invention as applied to the finger bar of a mower, showing the ordinary pitman of the mower, but not in any way showing the mower itself further than the bar, it being considered that this is readily understood and therefore unnecessary. The finger bar 1 is of the ordinary form having at the inner end the shoe 2 and along the front side the guards 3 which are securely attached to the bar. The pitman 4 is connected at its upper end to the crank head of the mower from which it receives a reciprocating motion, a further explanation of which it is unnecessary to give. The guards 3 have openings 5 therein to receive the knife sections of the mower.

6 is a hopper formed by the side pieces 7, and front and back pieces 8 8¹, the back piece of which is pivoted at 9, so that it can be swung backwardly and forwardly. The lower ends of the back and front pieces 8 8¹ extend below the side pieces, so that the hopper may be secured on the feed bar, as later explained.

10 are teeth in the upper edge of the side pieces, such teeth being adapted to receive a cross rod 11, which bears when the hopper is in position against the inner face of the back piece 8¹. The lower end of the front piece 8 has recesses 12 across it, spaced apart a distance equal to the pitch of the guards, there being some three or four recesses. The attachment of the hopper to the finger bar consists in simply placing the tips of the guards 3 in the recesses 12 and then closing the lower end of the rear piece 8¹ against the finger bar, holding it in such closed position by the rod 11 which operates on the teeth. To undo the hopper, release the rod, and the swinging back allows the guards to be freed from the openings when the hopper may be removed.

13 is a shoe fastened on the front piece 8 of the hopper, such shoe being for the purpose of making the furrow into which the potatoes drop.

14 is a circular disk, operating behind the hopper, and attached thereto by a swinging arm 15, the disk being designed to cover the potatoes that have fallen into the furrow formed by the shoe 13. The weight of the disk is sufficient to make it do the required work.

16 is a bar having its inner end shaped in the form of a knife 17 with two cutting edges. The bar is formed to replace the knife bar of the mower and has its outer end 18 adapted to slide in a guide 19 formed in the shoe 2.

20 is a flange on the arm to which is attached the lower end of the pitman 4, in this wise imparting to the knife a reciprocating motion within the hopper.

21 is a beam passing across the top of the hopper and having its ends forked, with holes 22 therein to receive a pin 23.

24 is an arm in the form of a bell crank, pivoted to the beam 21 by the pin 23. The lower end of the arm is forked and carries a pin 25, by which it is attached to the flange 20 which has holes 26 therein.

27 is a vertical reciprocating fork, attached by the pin 28 passing through its upper end to the bifurcated upper end 29 of the arm 24. The bar has several sets of holes 30 to receive the pin 28 allowing for any adjustment which may be made in the pin 23.

31 is a casing or housing for the upper part of the fork, to protect it from being jammed by the potatoes in the hopper. It will be seen that the length of the stroke of the knife and the fork will correspond to the adjustment of the pins 25, 23 and 28, the knife operating between the prongs of the fork.

A particular advantage which I consider I gain in applying my planter to the mower as described, is that all the necessary adjusting levers are already supplied, as is also the motion necessary for its operation, the only change being the removal of the mower knife and the insertion of my knife.

When the planter is attached and the hopper filled with potatoes the operation is simply that the knife cuts the potatoes and the fork forces them down through the guards 3 where they are deposited in the furrow formed by the shoe 13, being then covered over by the disk.

What I claim as my invention is:

1. In a potato planting machine, the combination with the finger bar of a mower, of a hopper adapted to be secured to the finger bar, a forward shoe and a rear disk on the hopper, a horizontal reciprocating knife and a vertical reciprocating fork within the hopper, as and for the purpose specified.

2. In a device of the class described, the combination with the finger bar of a mower, of a hopper adapted to be secured to the finger bar, a forward shoe on the hopper, a disk pivoted by an arm to the rear of the hopper, a horizontal reciprocating bar carrying a knife, and a vertical reciprocating fork within the hopper, the knife operating between the prongs of the fork, and a housing for the fork, as and for the purpose specified.

3. In a potato planting machine, the combination with the finger bar and the knife pitman of a mower, of a hopper adapted to be secured to the finger bar, a bar carrying at its one end a two edged knife and having its other end attached to the pitman from which it receives a horizontal reciprocating motion, a fork operating vertically within the hopper and reciprocated by the motion of the knife bar, a shoe forwardly on the hopper, and a disk pivoted by an arm to the rear of the hopper, and a housing for the fork, as and for the purpose specified.

4. In a potato planting machine, the combination with the finger bar having guards arranged along its forward side, and the knife pitman, of a mower, of a hopper having a pivoted back, and a set of recesses toward the lower inner edge of the front, means for holding the back in a fixed position, a bar carrying at its one end a two edged knife, and having its other end connected to the lower end of the pitman, a bell crank pivoted in a cross beam on the hopper, the lower end of such crank being connected to the knife bar, a fork extending vertically within the hopper and connected at its upper end to the upper end of the bell crank, a housing for the fork, a shoe secured on the hopper, and a disk to the rear of the hopper, as and for the purpose specified.

5. In a potato planting machine, the combination with the finger bar and the knife pitman of a mower, of a hopper having a pivoted back, the front and back extending below the sides, and recesses in the inner lower edge of the front to receive the tips of the guards on the finger bar, means whereby the pivoted back may be held in engagement with the finger bar, a horizontal bar carrying a two-edged blade, the outer end of the bar being connected to the pitman, a vertical fork connected to the bar by a bell crank, means whereby the length of the stroke of the fork and the knife may be controlled, a housing for the fork, a shoe on the forward face of the hopper and a disk pivoted at the rear of the hopper, as and for the purpose specified.

Signed at Winnipeg, in the Province of Manitoba, this 20th day of June 1907.

JOHN SIEFFERT.

Witnesses:
  M. A. SOMERVILLE,
  GERALD S. ROXBURGH.